D. C. SCHULTZ.
MECHANICAL BRAKE.
APPLICATION FILED FEB. 5, 1907.
912,325.
Patented Feb. 16, 1909.
2 SHEETS—SHEET 1.
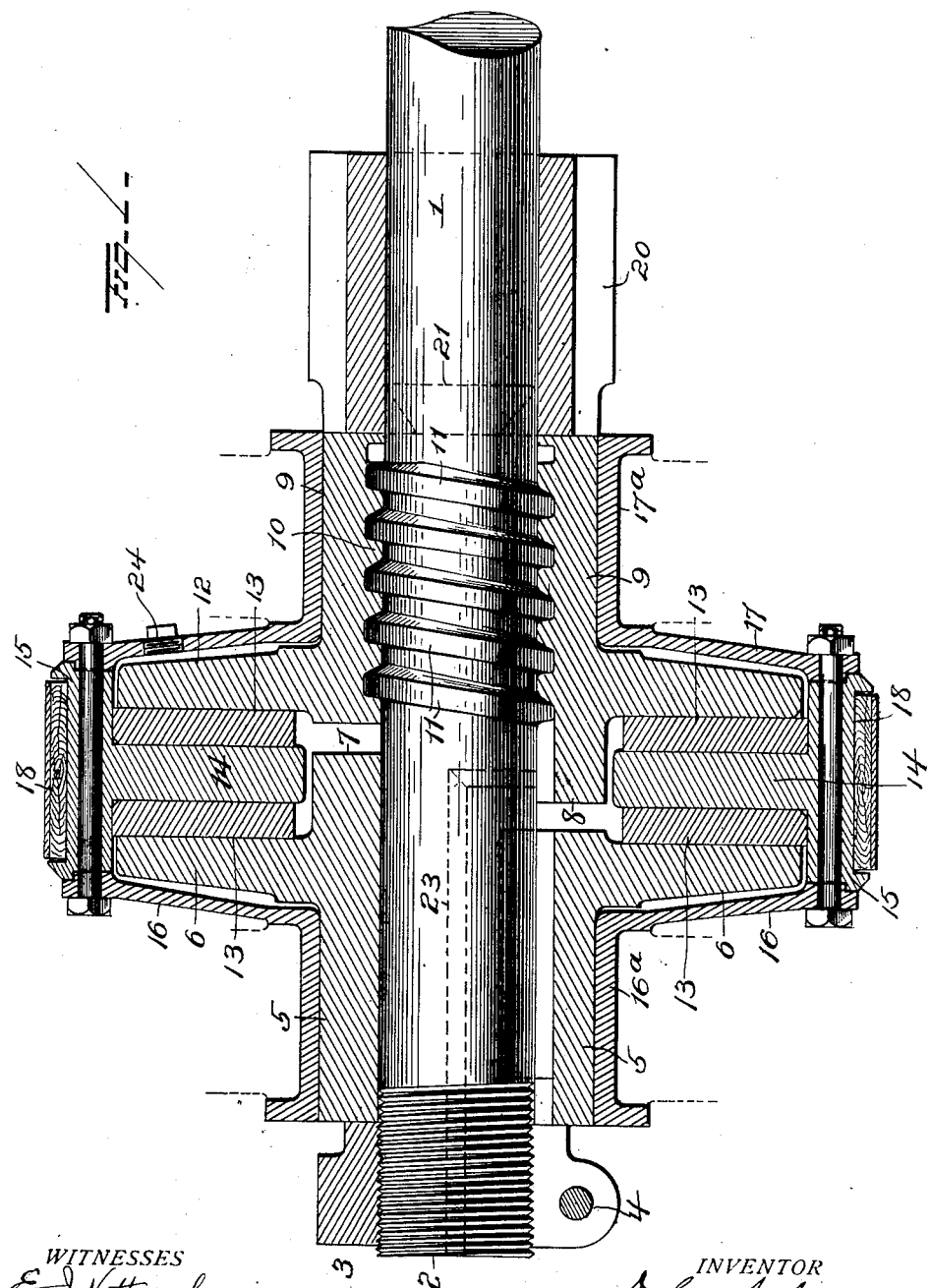
WITNESSES
INVENTOR

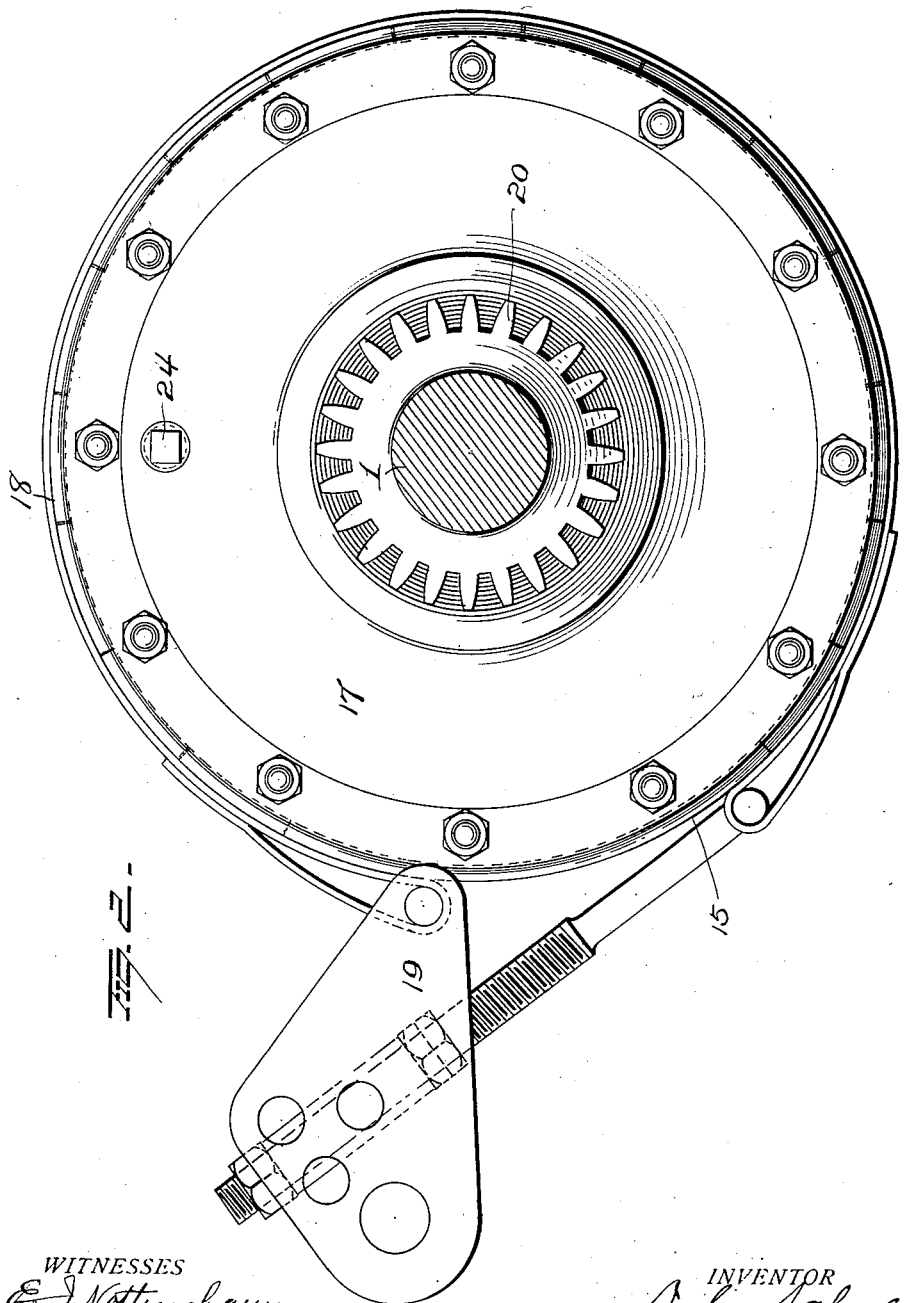

UNITED STATES PATENT OFFICE.

DAVID CHARLES SCHULTZ, OF ALLIANCE, OHIO, ASSIGNOR TO THE MORGAN ENGINEERING COMPANY, OF ALLIANCE, OHIO.

MECHANICAL BRAKE.

No. 912,325.      Specification of Letters Patent.      Patented Feb. 16, 1909.

Application filed February 5, 1907. Serial No. 355,960.

*To all whom it may concern:*

Be it known that I, DAVID CHARLES SCHULTZ, of Alliance, in the county of Stark and State of Ohio, have invented certain new and useful Improvements in Mechanical Brakes; and I do hereby declare the following to be a full, clear, and exact description of the invention, such as will enable others skilled in the art to which it appertains to make and use the same.

My invention relates to an improvement in mechanical brakes designed more particularly for the hoisting mechanism of overhead traveling cranes, and it consists in the parts and combinations of parts as will be more fully described and pointed out in the claims.

In the accompanying drawings, Figure 1 is a view partly in section and partly in elevation of my improved brake and Fig. 2 is a view in side elevation of same.

1 represents a driving shaft adapted to be mounted in suitable bearings and coupled up to a source of power. In overhead traveling cranes, this shaft would be geared up the armature shaft of a motor and drive the hoisting drum, and for the purpose of illustrating the operation of the brake or clutch, I will describe it as applied to the hoisting mechanism of an overhead traveling crane. This shaft 1 is provided with the screw threaded section 2 to which the adjusting nut 3 is clamped. This nut is split as shown in Fig. 1, its split ends being clamped by the bolt 4 which operates to lock the nut to the shaft.

Sleeve 5 is keyed to shaft 1 adjacent to the split nut 3, and bears at its end against the latter and is provided near its inner end with the friction disk 6, and at its inner end with a tooth or projecting section 7 which latter lies in the path of a similar tooth or projection 8 on the sleeve 9. These teeth 7 and 9 are sufficiently far apart to permit a limited rotary movement of each sleeve independently of the other, but prevents either sleeve from making a complete rotation independently of the other.

Sleeve 9 is provided internally with threads 10, meshing with threads 11 on shaft 1, and near its inner end with the friction disk 12, the two disks 6 and 12 being alike as to size and shape and are provided with straight parallel inner faces which rest in contact with the friction blocks or rings 13 located on opposite sides of the inwardly projecting friction ring 14. This ring 14 is integral with the circular rim 15 which latter is bolted to the side sections 16 and 17, the said rim and side sections constituting a casing for the friction devices. This section 16 of the casing has a cylindrical end 16ª which is snugly mounted on the sleeve 5, while the section 17 has a similar cylindrical end 17ª mounted on the sleeve 9.

With the casing in position as shown it will be seen that the several friction disks and interposed friction ring and blocks, are inclosed by the casing thus permitting the latter to be partly filled with oil, whereby the moving parts including the internal threads on the sleeve 9 and the threads 11 on shaft 1, may be thoroughly lubricated.

The rim 15 of the casing is provided with a peripheral groove in which the flexible brake strap 18 of any approved construction, rests. This strap is connected at its ends to the pivoted lever 19, the latter being so constructed that when the shaft 1 and the casing are turning in a direction to wind up the hoist chain, the brake band will be moved in a direction to loosen up on the casing and permit the latter to be freely revolved, but when the shaft is rotating in a direction to unwind the hoist chain, the brake band will be forced into contact with the rim of the casing and lock the latter against movement.

Mounted on shaft 1 adjacent to the outer end of sleeve 9 is the pinion 20, which latter is provided with a dovetailed slot adapted to receive a similarly shaped projection 21 on the sleeve 9; the sleeve and pinion are thus locked together before being placed upon the shaft 1, and when the parts are assembled as shown in Fig. 1 they will necessarily rotate in unison. By making the pinion separate from the sleeve, instead of integral as heretofore, it will not be necessary to replace the sleeve should the teeth on the pinion break or wear down.

The pinion 20 is in engagement with a pinion on the hoist drum, or in mesh with a train of gear for actuating the hoist drum, and when shaft 1 is rotated in a direction to wind up on the hoist rope, motion is transmitted thereto through the brake or clutch mechanism as follows: As shaft 1 is rotated, sleeve 5 which is keyed thereto is also positively rotated. The weight or load on sleeve 9 tends however to hold the friction disk of the latter out of contact with the coöperating friction surfaces but this tendency is overcome by the teeth 11 on shaft 1 moving against teeth 10 on sleeve 9, which operates to force sleeve 9 toward sleeve 5 thus firmly clamping the blocks 13 against the opposite sides of the friction ring 14, and causing all the parts to rotate in unison without any interference from the brake strap. It will now be seen that with the friction disks in contact with the friction blocks and the latter with the friction ring on the casing, that a continued rotary motion of shaft 1 in a direction to hoist will be communicated to the hoisting drum through the sleeve 9 and pinion 20. It will also be seen that when there is a load suspended from the hoisting drum, the weight of said load tends to turn the sleeve 9 on the screw and apply the friction brake, hence in hoisting the sleeves are locked to and rotate with shaft 1.

To lower the load, the direction of rotation of the motor and shaft 1 are reversed, and as a retrograde movement of the casing is prevented by the brake as previously explained, this reverse movement of the shaft tends to separate the sleeves 5 and 9 and thus relieve the friction between the friction devices. As soon as the friction is relieved, the sleeve 9 which sustains the load will begin to race, and thus move longitudinally on shaft 1 toward sleeve 5. This racing movement is hardly noticeable, as the longitudinal movement of sleeve 9 on shaft 1 is comparatively short, but as it begins to race or turn, the longitudinal movement of the sleeve 9 carries its friction disk into contact with the friction blocks against the adjacent face of the stationary ring of the casing thus checking the speed. The continued movement of the shaft 1, again separates the sleeves 5 and 9 thus allowing sleeve 9 to rotate in a direction to lower the load, and these movements are continued until the load has been deposited. With this construction it will be seen that in hoisting the friction surfaces are always in contact, and all the parts are locked to shaft 1, so as to rotate continuously therewith. In lowering the rotation of the shaft tends to and does move the sleeve 9 longitudinally of the shaft thus separating the clutching surfaces, but as the weight of the load is on sleeve 9, this weight tends to turn the sleeve faster than the shaft, which unequal movement as before explained, moves the sleeve on the shaft toward the fixed sleeve 5 and again applies the friction. These movements of the sleeve 9 are in rapid succession and practically continuous and therefore hardly noticeable to the eye.

Oil may be introduced into the casing through a bore 23 in shaft 1 or it may be admitted through the hole in the casing closed by plug 24.

By the term "integral" employed in the claim, I do not intend to limit myself to friction disks or rings cast integral with the parts, but I intend the term to cover disks and rings fixed to the sleeves and casing respectively so that the said parts positively rotate in unison, in contradistinction to loose expanding rings which are forced outwardly against the inclosing casing.

It is evident that many slight changes might be made in the relative arrangement of parts herein shown and described without departing from the spirit and scope of my invention hence I would have it understood that I do not wish to confine myself to the exact construction and arrangement of parts shown and described, but, Having fully described my invention what I claim as new and desire to secure by Letters-Patent, is:—

1. The combination with a shaft having a screw threaded section, of a threaded sleeve mounted thereon and provided with an integral friction disk, a sleeve fixed to said shaft and provided with an integral friction disk, a casing inclosing said disks and provided with an integral inwardly projecting friction ring, the latter being located between the friction disks, a pinion fixed to the threaded sleeve and means for preventing the casing from rotating in one direction.

2. The combination with a shaft having a screw threaded section, of a threaded sleeve mounted on said threaded section and provided with an integral friction disk, a sleeve fixed to said shaft and provided with an integral friction disk, a casing inclosing the disks, the rim of said casing having an integral inwardly projecting friction ring located between said disks, a pinion mounted on the shaft and connected to the threaded sleeve, and means for preventing said casing from rotating in one direction.

3. The combination with a shaft having a screw threaded section, of an internally threaded sleeve mounted on the threaded section of the shaft and provided with an integral friction disk, a sleeve keyed to the shaft and provided with an integral friction disk, a lubricant containing casing mounted on said sleeves and provided with an integral internal friction ring located between the friction disks on the sleeves, friction blocks interposed between said disks and ring, a pinion coupled up to the internally threaded sleeve, and means for preventing said casing from rotating in one direction.

4. The combination with a shaft having a screw threaded section, of an internally threaded sleeve mounted on the threaded section of the shaft and provided with an integral friction disk, a sleeve fixed to said shaft and provided with an integral friction disk, a lubricant containing casing mounted on said sleeves and inclosing the disks and provided with an integral inwardly projecting friction ring, means for locking said casing against rotation in one direction and a pinion detachably connected with the threaded sleeve.

5. The combination with a shaft having a screw threaded section, of an internally threaded sleeve mounted on said threaded section and provided with an integral friction disk, a sleeve fixed to said shaft and provided with an integral friction disk, a casing inclosing the disks and provided with an integral inwardly projecting friction ring, friction blocks interposed between said friction disks and ring, a pinion detachably connected with the threaded sleeve, and means for locking the casing against rotation in one direction.

In testimony whereof, I have signed this specification in the presence of two subscribing witnesses.

DAVID CHARLES SCHULTZ.

Witnesses:
N. C. FETTERS,
DELIA REBILLOT.